United States Patent [19]

Tsuji et al.

[11] Patent Number: 5,677,382
[45] Date of Patent: Oct. 14, 1997

[54] ETHYLENE-α-OLEFIN-NON-CONJUGATED DIENE COPOLYMER RUBBER COMPOSITION

[75] Inventors: Shoei Tsuji, Mie-ken; Hidekatsu Gotoh, Suzuka; Akihiko Morikawa, Yokkaichi; Fumio Tsutsumi, Yokkaichi; Yoji Mori, Yokkaichi, all of Japan

[73] Assignee: Japan Synthetic Rubber Co., Ltd., Tokyo, Japan

[21] Appl. No.: 567,484

[22] Filed: Dec. 5, 1995

[30] Foreign Application Priority Data

Dec. 19, 1994 [JP] Japan ................ 6-333771

[51] Int. Cl.$^6$ ............................ C08L 23/16
[52] U.S. Cl. ................ 525/237; 525/193; 525/240
[58] Field of Search ................ 525/240, 237, 525/193

[56] References Cited

U.S. PATENT DOCUMENTS

| | | | |
|---|---|---|---|
| 4,722,971 | 2/1988 | Datta et al. | 525/211 |
| 5,242,971 | 9/1993 | Nakahama | 524/526 |
| 5,449,713 | 9/1995 | Nakahama | 524/491 |

FOREIGN PATENT DOCUMENTS

| | | |
|---|---|---|
| 0 446 380 | 9/1991 | European Pat. Off. . |
| 0 532 764 | 3/1993 | European Pat. Off. . |
| 55-18404 | 2/1980 | Japan . |
| 61-278540 | 12/1986 | Japan . |
| 63-37149 | 2/1988 | Japan . |
| 3-146531 | 6/1991 | Japan . |
| 4-76011 | 3/1992 | Japan . |
| 4-80245 | 3/1992 | Japan . |

OTHER PUBLICATIONS

Japio, AN 92-080245, JP-A-4 080 245, Mar. 13, 1992.

*Primary Examiner*—Irina S. Zemel
*Attorney, Agent, or Firm*—Oblon, Spivak, McClelland, Maier & Neustadt, P.C.

[57] ABSTRACT

An ethylene-α-olefin-non-conjugated diene copolymer rubber composition comprising a low molecular weight component copolymer composed of an ethylene-α-olefin-non-conjugated diene copolymer having a Mooney viscosity ($ML_{1+4}$, 100° C.) of 10 to 150, an α-olefin content of 30 to 60% by weight and an iodine value of 37 to 65, and a high molecular weight component copolymer composed of an ethylene-α-olefin-non-conjugated diene copolymer having a Mooney viscosity ($ML_{1+4}$, 100° C.) of 100 to 500, an α-olefin content of 15 to 50% by weight and an iodine value of 3 to 15, the ratio of the iodine value of the low molecular weight component copolymer to the iodine value of the high molecular weight component copolymer being at least 4/1. The above composition can inhibit a gel from being produced during processing and achieve a high degree of cross-linking and is excellent in compression set, shape-retention and sponge surface skin.

15 Claims, 1 Drawing Sheet

ETHYLENE-α-OLEFIN-NON-CONJUGATED DIENE COPOLYMER RUBBER COMPOSITION

BACKGROUND OF THE INVENTION

This invention relates to an ethylene-α-olefin-non-conjugated diene copolymer rubber composition which is excellent in processibility, sealing properties and the like and suitable for a wide use including sealing materials for automobile, particularly suitable for sponge rubber.

Ethylene-α-olefin-non-conjugated diene copolymer rubbers are excellent in heat resistance, ozone resistance, weather resistance and the like, and are widely used as sponge rubbers in which the above copolymer rubber has been cross-linked and foamed, particularly as sealing materials for automobile such as door seal, roof side rail, trunk seal and the like. However, as the performance has been heightened, such sponge rubbers have been required to have high level performance.

For example, after the door of an automobile has been shut, the sealing material is placed in the compression state for a long period of time. Therefore, it has been considered important that the compression set be small, and hence, it is also necessary to heighten the degree of cross-linking of the copolymer rubber. Moreover, recently, the cross-sectional shape of a sealing material for automobile has become complicated, so that when a sponge rubber is produced by a conventional continuous vulcanization method, such a distortion is caused that the sponge rubber is deformed owing to its own weight before the completion of vulcanization, and such a problem that the desired shape cannot be retained is raised. Therefore, a sponge rubber excellent in shape-retention which is an index of the distortion has been required. In addition, in order to heighten the added value of a sponge rubber, severe conditions are imposed on the surface properties, and in order to enhance the productivity, it is also necessary that the sponge rubber be excellent in processibility such as processibility in internal mixer, mill-processibility, extruder-processibility or the like. In particular, it is important that a gel is hardly produced owing to the shearing strain and thermal history during the processing.

Therefore, in order to solve the above problems, it has often been tried to combine a low molecular weight component copolymer with a high molecular weight component copolymer in a rubber composition comprising an ethylene-α-olefin-non-conjugated diene copolymer rubber. However, in such a rubber composition, there are many factors which severely affect the characteristics of said rubber composition and a sponge rubber produced therefrom, and these factors correlate complicatedly with one another. Therefore, the real situation is that it is very difficult to select and combine appropriate factors.

For example, Japanese Patent Application Kokai Mo. 63-37,149 discloses a rubber composition in which the ethylene content and diene content of the low molecular weight component copolymer are about 30 to 80% by weight and about 1.5 to about 10% by weight, respectively; the ethylene content and diene content of the high molecular weight component copolymer are about 45 to 90% by weight and 0 to about 5% by weight, respectively; and the ratio of the diene content of the low molecular weight component copolymer to the diene content of the high molecular weight component copolymer is at least 2/1. However, in said rubber composition, the diene content of the low molecular weight component copolymer is too low to achieve a high degree of cross-linking, and the compression set is also insufficient.

Moreover, Japanese Patent Application Kokai No. 4-80,245 discloses a rubber composition in which the ethylene/α-olefin weight ratio is 73/27 to 40/60; the iodine value is 10 to 36; the ratio of the iodine value of the low molecular weight component copolymer to the iodine value of the high molecular weight component copolymer is 1.1/1 to 4/1; the Mooney viscosity ($ML_{1+4}$, 121° C. is 50 to 100, and Japanese Patent Application Kokai No. 3-146,531 discloses a rubber composition consisting of copolymer rubber A and copolymer rubber B in which the copolymer rubber A has an ethylene/α-olefin weight ratio of 73/27 to 40/60, an iodine value of 8 to 33 and a Mooney viscosity ($ML_{1+4}$, 121° C.) of 130 to 195; and the copolymer rubber B has an ethylene/α-olefin weight ratio of 73/27 to 40/60, an iodine value of 10 to 36 and a Mooney viscosity ($ML_{1+4}$, 121° C.) of 20 to 55. However, in the above rubber composition, the iodine value of the low molecular weight component copolymer is so low that a sufficient degree of cross-linking cannot be obtained and the compression set is large. In addition, since the iodine values of the low molecular weight component copolymer and the high molecular weight component copolymer are low, there is such a problem that a gel tends to be produced during the processing.

That is to say, in the case of the conventional rubber compositions, it is impossible to achieve simultaneously the inhibition of a gel from being produced and the improvement in degree of cross-linking and compression set without deteriorating other various characteristics.

SUMMARY OF THE INVENTION

An object of this invention is to provide an ethylene-α-olefin-non-conjugated diene copolymer rubber composition which can inhibit a gel from being produced during processing and achieve a high degree of cross-linking, is excellent in compression set and also excellent in shape-retention, sponge surface skin and the like.

Other objects and advantages of this invention will become apparent from the following description.

According to this invention, there is provided an ethylene-α-olefin-non-conjugated diene copolymer rubber composition which comprises a low molecular weight component copolymer and a high molecular weight component copolymer, said low molecular weight component copolymer being composed of an ethylene-αolefin-non-conjugated diene copolymer having a Mooney viscosity ($ML_{1+4}$, 100° C.) of 10 to 150, an α-olefin content of 30 to 60% by weight and an iodine value of 37 to 65; said high molecular weight component copolymer being composed of an ethylene-α-olefin-non-conjugated diene copolymer having a Mooney viscosity ($ML_{1+4}$, 100° C.) of 100 to 500, an α-olefin content of 15 to 50% by weight and an iodine value of 3 to 15; and the ratio of the iodine value of the low molecular weight component copolymer to the iodine value of the high molecular weight component copolymer is at least 4/1.

DETAILED DESCRIPTION OF THE INVENTION

Ethylene-α-olefin-non-conjugated diene copolymer

Figure 1:
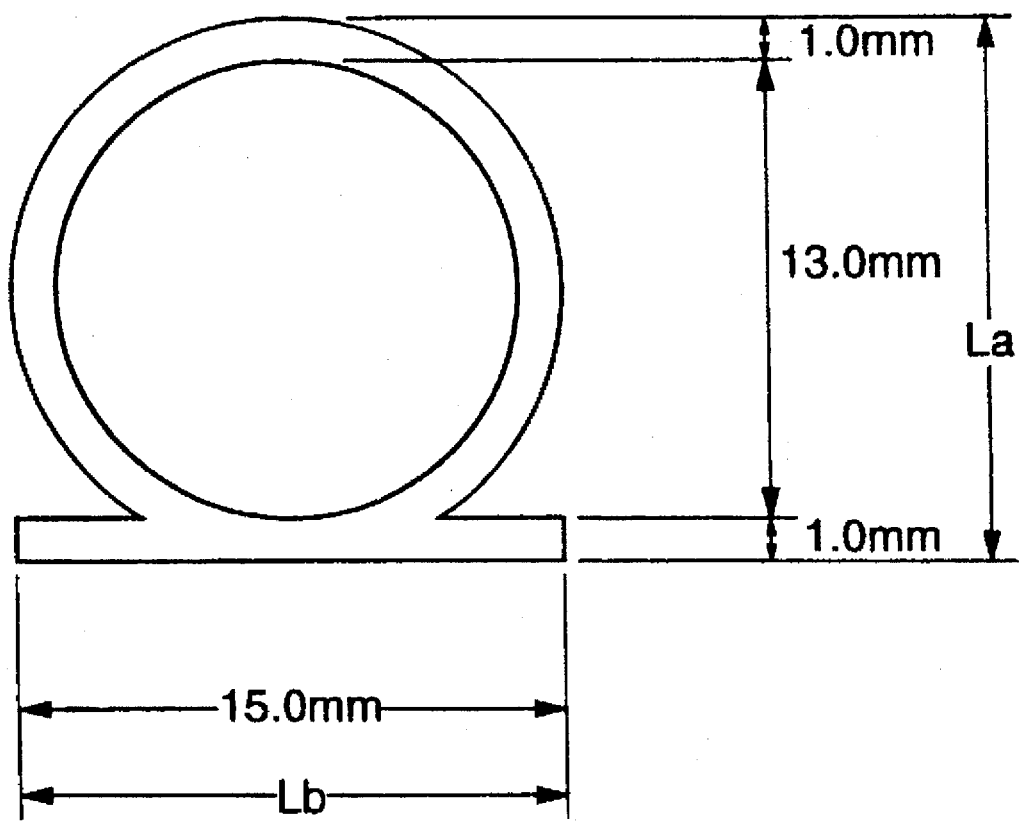
FIG. 1 is a cross-sectional view of a die used in the evaluation of shape-retention and compression set in Examples and Comparative Examples.

The ethylene-α-olefin-non-conjugated diene copolymer rubber composition of this invention (referred to hereinafter as the copolymer rubber composition) comprises two ethylene-α-olefin-non-conjugated diene copolymers (referred to hereinafter as the copolymer rubbers), one of which is the low molecular weight component copolymer and the other is the high molecular weight component copolymer.

In the copolymer rubbers, the α-olefin includes, for examples, α-olefins having 3 to 12 carbon atoms, and specific examples thereof include propylene, 1-butene, 3-methyl-1-butene, 1-pentene, 3-methyl-1-pentene, 4-methyl-1-pentene, 3-ethyl-1-pentene, 1-hexene, 1-octene, 1-decene, 1-dodecene and the like. Propylene is particularly preferable. These α-olefins may be used alone or in admixture of two or more.

The α-olefin contents of the copolymer rubbers are such that the α-olefin content of the low molecular weight component copolymer is 30 to 60% by weight, preferably 35 to 55% by weight, and the α-olefin content of the high molecular weight component copolymer is 15 to 50% by weight, preferably 15 to 45% by weight. Also, from the viewpoint of roll-workability during processing and the flow properties during extrusion, it is preferable that the α-olefin content of the low molecular weight component copolymer is higher than that of the high molecular weight component copolymer.

The non-conjugated diene includes, for example, ethylidenenorbornene, dicyclopentadiene, 5-vinyl-2-norbornene, 2,5-norbornadiene, 1,4-pentadiene, 1,4-hexadiene, 1,5-hexadiene, 1,7-octadiene, 1,9-decadiene, 1,11-dodecadiene, 3,6-dimethyl-1,7-octadiene, 4,5-dimethyl-1,7-octadiene and the like. In particular, ethylidenenorbornene and dicyclopentadiene are preferable. The above non-conjugated dienes may be used alone or in admixture of two or more.

The iodine values of the copolymer rubbers are such that the iodine value of the low molecular weight component copolymer is 37 to 65, preferably 37 to 55, and the iodine value of the high molecular weight component copolymer is 3 to 15, preferably 5 to 12. In this case, when the iodine value of the low molecular weight component copolymer is less than 37, it becomes difficult to increase the degree of cross-linking of the composition, and the compression set of a sponge rubber becomes large. On the other hand, when the iodine value exceeds 65, it becomes difficult to achieve a high degree of foaming. Also, when the iodine value of the high molecular weight component copolymer is less than 3, the compression set of a sponge rubber is deteriorated, while when the iodine value exceeds 15, a gel tends to be produced during the processing in internal mixer and the extruder-processing.

The ratio of the iodine value of the low molecular weight component copolymer to the iodine value of the high molecular weight component copolymer is at least 4/1. In this case, when the iodine value ratio is less than 4/1, a gel tends to be produced during the processing in internal mixer and the extruder-processing, and hence, it becomes difficult to achieve a high degree of foaming, and the sponge surface skin is deteriorated.

The Mooney viscosities ($ML_{1+4}$, 100° C.) of the copolymer rubbers are such that the Mooney viscosity of the low molecular weight component copolymer is 10 to 150, preferably 30 to 100 and the Mooney viscosity of the high molecular weight component copolymer is 100 to 500, preferably 150 to 450. In this case, when the Mooney viscosity of the low molecular weight component copolymer is less than 10, the strength and shape-retention of sponge rubber during the cross-linking and foaming are deteriorated, while when the Mooney viscosity exceeds 150, the processibility in internal mixer is deteriorated. When the Mooney viscosity of the high molecular weight component copolymer is less than 100, the compression set of a sponge rubber is deteriorated, a gel tends to be produced and the shape-retention becomes insufficient, while when the Mooney viscosity exceeds 500, the processibility in internal mixer becomes low.

In this invention, the Mooney viscosity of the low molecular weight component copolymer and the Mooney viscosity of the high molecular weight component copolymer are adjusted so that the difference between the two Mooney viscosities ($ML_{1+4}$, 100° C.) is preferably 30 or more, more preferably 50 to 450, by appropriately selecting the Mooney viscosity of one of the two copolymers correspondingly to the Mooney viscosity of the other copolymer.

It is preferable that the weight ratio of the low molecular weight component copolymer to the high molecular weight component copolymer is within the range of from 51/49 to 95/5.

In this invention, the low molecular weight component copolymer can be used alone or in admixture of two or more and the high molecular weight component copolymer may also be used alone or in admixture of two or more.

The copolymer rubbers used in this invention, including both the low molecular weight component copolymer and the high molecular weight component copolymer, can be produced by a conventional medium- or low-pressure polymerization process, for example, a method which comprises polymerizing ethylene, an α-olefin and a non-conjugated diene in the presence of a Ziegler-Natta catalyst consisting of a transition metal compound and an organometallic compound, for example, a catalyst consisting of at least one solvent-soluble vanadium compound and at least one organoaluminum compound, in a suitable solvent while, if necessary, supplying hydrogen as a molecular weight modifier. The polymerization in this case can be carried out by a gas phase method (fluidized bed or stirring bed) or even by a liquid phase method (a slurry method or a solution method).

As the above-mentioned solvent-soluble vanadium compound, preferable are $VOCl_3$, $VCl_4$ and reaction products of $VOCl_3$ or $VCl_4$ with at least one alcohol. In this case, the above alcohol includes, for example, methanol, ethanol, n-propanol, isopropanol, n-butanol, sec-butanol, t-butanol, n-hexanol, n-octanol, 2-ethylhexanol, n-decanol, n-dodecanol and the like. Among them, alcohols having 3 to 8 carbon atoms are preferable.

The above organoaluminum compound includes, for example, triethylaluminum, triisobutylaluminum, tri-n-hexylaluminum, diethylaluminummonochloride, diisobutylaluminum monochloride, ethylaluminum sesquichloride, butylaluminum sesquichloride, ethylaluminum dichloride, butylaluminum dichloride, methylaluminoxane which is the reaction product of trimethylaluminum with water, and the like. These organoaluminum compounds may be used alone or in admixture of two or more. Particularly preferable organoaluminum compounds are ethylaluminum sesquichloride, butylaluminum sesquichloride, a mixture of ethylaluminum sesquichloride and triisobutylaluminum, and a mixture of triisobutylaluminum and butylaluminum sesquichloride.

As the above-mentioned solvent, usually, hydrocarbon solvents are used, and preferable hydrocarbon solvents are n-pentane, n-hexane, n-heptane, n-octane, isooctane, cyclohexane and the like. These hydrocarbon solvents may be used alone or in admixture of two or more.

The copolymer rubber composition of this invention can be prepared by (A) a method which comprises producing separately a low molecular weight component copolymer and a high molecular weight component copolymer, then mixing the two and thereafter removing the solvent to obtain a solid composition or (B) a method which comprises producing one of the low molecular weight component copolymer and the high molecular weight component copolymer in the first of two reactor connected in series, supplying the polymerization product obtained to the second reactor and producing the other copolymer in the second polymerizer, and then removing the solvent to obtain a solid composition.

Compounding Components

The copolymer rubber composition of this invention may have, if necessary, compounded therewith a filler, a softening agent, a cross-linking agent, a foaming agent and the like.

The above filler includes, for example, carbon blacks such as SRF, FEF, HAF, ISAF, SAF, FT, MT and the like; inorganic fillers such as fine particle silicic acid, calcium carbonate, magnesium carbonate, clay, talc and the like; etc. These fillers may be used alone or in admixture of two or more.

The amount of the filler compounded is preferably 50 to 200 parts by weight per 100 parts of a total of the low molecular weight component copolymer and the high molecular weight component copolymer.

The above softening agent includes process oils such as aromatic oils, naphthenic oils, paraffinic oils and the like which are usually used in rubbers; vegetable oils such as coconut oil and the like; etc. Among these softening agents, process oils are preferred, and paraffinic oils are particularly preferable. These softening agents may be used alone or in admixture of two or more.

The amount of the softening agent compounded in this invention is preferably 30 to 150 parts by weight per 100 parts by weight of a total of the low molecular weight component copolymer and the high molecular weight component copolymer.

The above-mentioned cross-linking agent includes, for example, sulfur such as powdery sulfur, precipitated sulfur, colloidal sulfur, insoluble sulfur and the like; inorganic vulcanizing agents such as sulfur chloride, selenium, tellurium and the like; sulfur-containing organic compounds such as morpholine disulfides, alkylphenol disulfides, thiuram disulfides, dithiocarbamic acids and the like; organic peroxides such as 1,1-di-t-butylperoxy-3,3,5-trimethylcyclohexane, di-t-butyl peroxide, dicumyl peroxide, t-butylcumyl peroxide, 2,5-dimethyl-2,5-di(t-butylperoxy)hexane, 1,3-bis(t-butylperoxyisopropyl) benzene and the like; etc. These cross-linking agents may be used alone or in admixture of two or more.

The amount of the cross-linking agent compounded in this invention may be varied depending upon the kind of cross-linking agent, the iodine value of the copolymer rubber composition and the like, and in the case of, for example, sulfur, the amount is preferably 0.1 to 10 parts by weight, more preferably 0.5 to 5 parts by weight, per 100 parts by weight of a total of the low molecular weight component copolymer and the high molecular weight component copolymer.

When sulfur is used as the cross-linking agent, there may, if necessary, be further compounded a vulcanization accelerator and an accelerator activator.

Such a vulcanization accelerator includes, for example, hexamethylenetetramine; aldehyde ammonias such as acetaldehyde ammonia and the like; guanidines such as diphenylguanidine, di(o-tolyl)guanidine, o-tolyl biguanide and the like; thioureas such as thiocarbanilide, di(o-tolyl) thiourea, N,N'-diethylthiourea, tetramethylthiourea, trimethylthiourea, dilaurylthiourea and the like; benzothiazoles such as mercaptobenzothiazole, dibenzothiazole disulfide, 2-(4-morpholinothio)benzothiazole, 2-(2,4-dinitrophenyl)mercaptobenzothiazole, N,N'-(diethylthiocarbamoylthio)benzothiazole and the like; sulfenamides such as N-t-butyl-2-benzothiazylsulfenamide, N,N'-dicyclohexyl-2-benzothiazylsulfenamide, N,N'-diisopropyl-2-benzothiazylsulfenamide, N-cyclohexyl-2-benzothiazylsulfenamide and the like; thiurams such as tetramethylthiuram disulfide, tetraethylthiuram disulfide, tetrabutylthiuram disulfide, tetramethylthiuram monosulfide, dipentamethylenethiuram tetrasulfide and the like; thiocarbamic acid salts such as zinc dimethylthiocarbamate, zinc diethylthiocarbamate, zinc di-n-butylthiocarbamate, zinc ethylphenyldithiocarbamate, sodium dimethyldithiocarbamate, copper dimethyldithiocarbamate, tellurium dimethylthiocarbamate, iron dimethylthiocarbamate and the like; xanthogenic acid salts such as zinc butylthioxanthogenate, zinc isopropylxanthogenate and the like; etc. These vulcanization accelerators may be used alone or in admixture of two or more.

The amount of the vulcanization accelerator compounded in this invention is preferably 0.1 to 20 parts by weight, more preferably 0.2 to 10 parts by weight, per 100 parts by weight of a total of the low molecular weight component copolymer and the high molecular weight component copolymer.

The above-mentioned accelerator activator includes, for example, metal oxides such as magnesium oxide, zinc oxide, litharge, red lead, white lead and the like; organic acids such as stearic acid, oleic acid and the like; organic acid salts such as zinc stearate and the like; etc. In particular, zinc oxide and stearic acid are preferable. These accelerator activators may be used alone or in admixture of two or more.

The amount of the accelerator activator compounded in this invention is preferably 3 to 20 parts by weight per 100 parts by weight of a total of the low molecular weight component copolymer and the high molecular weight component copolymer.

When an organic peroxide is used as the cross-linking agent, a cross-linking coagent may be further compounded as required.

The cross-linking coagent includes, for example, sulfur; sulfur compounds such as dipentamethylenethiuram tetrasulfide and the like; polyfunctional monomers such as polyethylene dimethacrylate, divinylbenzene, diallyl phthalate, triallyl cyanurate, meta-phenylene bismaleimide, toluylene bismaleimide and the like; oxime compounds such as p-quinoneoxime, p,p'-benzoylquinoneoxime and the like; etc. These cross-linking coagents may be used alone or in admixture of two or more.

The above-mentioned foaming agent includes inorganic foaming agents such as ammonium carbonate, sodium bicarbonate, anhydrous sodium nitrate and the like; and organic foaming agents such as dinitrosopentamethylenetetramine, N,N'-dimethyl-N,N'-dinitrosoterephthalamide, benzenesulfonyl hydrazide, p,p'-oxybis-(benzenesulfonyl hydrazide), 3,3'-disulfonhydrazidediphenylsulfone, azobisisobutyronitrile, azobisformamide and the like. These foaming agents may be used alone or in admixture of two or more.

Also, a urea type, organic acid type or metal salt type foaming adjuvant may be used together with the above foaming agent.

The amounts of the foaming agent and the foaming adjuvant compounded in this invention may be varied depending upon the kinds thereof and the desired degree of foaming; however, the amount of the foaming agent is preferably 0.5 to 20 parts by weight, more preferably 1 to 15 parts by weight, per 100 parts by weight of a total of the low molecular weight component copolymer and the high molecular weight component copolymer, and the amount of the foaming adjuvant is preferably 1 to 20 parts by weight per 100 parts by weight of a total of the low molecular weight component copolymer and the high molecular weight component copolymer.

Moreover, the copolymer rubber composition of this invention may, if necessary, have compounded therewith other additives such as a moisture absorber, a plasticizer, an age resister, an antioxidant, a heat stabilizer, an ultraviolet absorber, a lubricant, a release agent, a flame-retardant, an antistatic agent, a dye, a pigment, a fungicide and the like. Also, the copolymer rubber composition may have compounded therewith other polymers such as natural rubber, polyisoprene rubber, polybutadiene rubber, styrene-butadiene rubber, acrylonitrile-butadiene rubber, butyl rubber, acrylic rubber, ethylene-α-olefin rubber, low-density polyethylene, medium-density polyethylene, high-density polyethylene, straight chain low-density polyethylene, polypropylene and the like.

In the preparation of the copolymer rubber composition, a conventional mixer such as Banbury mixer, roll mixer, extruder or the like can be used.

Production of Sponge Rubber

The copolymer rubber composition of this invention is particularly useful for sponge rubber. Such a sponge rubber can be produced by compounding the above-mentioned cross-linking agent or foaming agent or the like as necessary with the copolymer rubber composition to prepare a rubber compound and thereafter subjecting the rubber compound to cross-linking and foaming by, for example, a conventional method.

The method and order of compounding the components in the production of the sponge rubber are not critical, and the mixer to be used may be a known one. However, it is particularly preferable to mix the low molecular weight component copolymer, the high molecular weight component copolymer, the filler, the softening agent and the like using a Banbury mixer and thereafter mix the resulting mixture with the cross-linking agent, the foaming agent, the foaming adjuvant and the like using a roll mixer. Also, when they are mixed using an extruder, the low molecular weight component copolymer and the high molecular weight component copolymer are previously mixed with a part of the compounding components by means of a Banbury mixer or the like and then the resulting mixture is fed to the extruder, after which the remaining compounding components are separately fed to the extruder to be mixed with the above mixture therein. Alternatively, the low molecular weight component copolymer, the high molecular weight component copolymer and all the compounding components may be fed directly to an extruder and mixed therein.

Subsequently, the desired sponge rubber can be produced from the thus obtained rubber compound according to a procedure which is usually used in the production of a sponge rubber, for example, by a method which comprises heating the rubber compound in the mold of a known crosslinking-foaming apparatus to cross-link and foam the rubber compound; by a method which comprises molding the rubber compound into the desired shape using an extrusion-molding machine and then heating the molded product in a cross-linking vessel; or by other like methods. The heating temperature and time during the cross-linking and foaming may be varied depending upon the kinds of the cross-linking agent and foaming agent, the degree of foaming and the like; however, the heating temperature is preferably 150° to 280° C., more preferably 180° to 250° C., and the heating time is preferably 2 to 15 minutes, more preferably 3 to 10 minutes.

The copolymer rubber composition of this invention is particularly high in degree of cross-linking, excellent in compression set and also excellent in processibility in internal mixer, extruder-processibility, shape-retention, sponge surface skin and the like and hardly produces a gel.

Accordingly, the copolymer rubber composition of this invention can be very suitably used particularly as a sponge rubber, and as a seal material such as door seal, roof side rail, trunk seal and the like of automobile. It is also useful for a wide use including seal materials for transport machines, seal materials for civil engineering and construction and seal materials for general machine and apparatus, electric wire coatings and the like.

DESCRIPTION OF PREFERRED EMBODIMENTS

Examples and Comparative Examples are shown below to explain this invention in more detail; however, this invention should not be construed to be limited thereto.

In the Examples and Comparative Examples, the measurements and evaluations were effected according to the following methods:

(1) Propylene content (% by weight)

Measured by an infrared absorption spectrum method.

(2) Iodine value

Measured according to an infrared absorption spectrum method.

(3) Mooney viscosity ($ML_{1+4}$, 100° C.)

Measured under such conditions that the measurement temperature was 100° C., the preheating time was 1 minute, and the time taken until the viscosity was read was 4 minutes.

(4) Extruder-processibility (Garvey die evaluation)

Measured according to the ASTM-D2230A method.

(5) Shape-retention

A molded article obtained by extruding an unvulcanized rubber compound (mixture of the components in Compound I and the components in Compound II in Table 1) through a die having the sectional shape shown in FIG. 1 was allowed to stand in the horizontal state for 7 minutes in an atmosphere kept at 220° C., and thereafter, the shape-retention was evaluated on the basis of (La/Lb)×100 in which La represents the height size of the molded article and Lb represents the transverse size of the molded article as shown in FIG. 1.

(6) Stress retention

A rubber compound obtained by mixing the components in Compound I in Table 1 was molded into a cylindrical test specimen (13 mmφ×6 mm) and the compression stress relaxation test was subjected to measurement of compression stress using an automatic compression stress relaxation tester under the conditions of a compressibility of 20% and a measurement temperature of 100° C., and the stress retention was determined by the following equation:

$$\text{Stress retention} = \frac{\text{Compression stress (after } t = 1 \text{ sec)}}{\text{Compression stress just after test } (t = 0 \text{ sec})}$$

(7) Sponge characteristics (i) Specific density

Measured according to the expanded rubber physical test method defined in the Society of Rubber Industrial Japan Standards.

(ii) Compression set

A molded article obtained by extruding an unvulcanized rubber through a die having the sectional shape shown in FIG. 1 was vulcanized and foamed and then subjected to 50% compressive strain in the height direction in FIG. 1, and the compressive strains after 22 hours at 70° C. and after 200 hours at 70° C. were measured.

(iii) Sponge surface skin

The skin was evaluated visually on the smoothness of surface of sponge rubber, gloss and adhesiveness based on three ratings of excellent (o), fair (Δ) and bad (x).

(8) Gelation time

A sample obtained by kneading the rubber compound obtained by mixing the components shown in Compound I in Table 1 was subjected to measurement of the starting time of torque rise at 130° C. at a rate of shearing strain of 20/sec by means of a stress relaxation measuring apparatus [JSR Elastograph manufactured by Japan Synthetic Rubber Co., Ltd. (see Japanese Patent Application Kokoku No. 5-25, 059)].

TABLE 1

| Components | Parts by weight |
|---|---|
| [Compound I] | |
| Copolymer mixture in Table 2 | 100 |
| Carbon black*1 | 80 |
| Carbon black*2 | 20 |
| Paraffinic oil*3 | 60 |
| Zinc oxide | 8 |
| Stearic acid | 2 |
| Moisture absorber*4 | 5 |
| [Compound II] | |
| Sulfur | 1 |
| MBT*5 | 0.5 |
| ZnMDC*6 | 1 |

TABLE 1-continued

| Components | Parts by weight |
|---|---|
| ZnBDC*7 | 0.4 |
| DPTT*8 | 0.8 |
| TETD*9 | 0.5 |
| Sulfur-containing compound*10 | 0.5 |
| Foaming agent*11 | 3.5 |

In Table 1, *1 to *11 have the following meanings:

*1: Asahi 50HG manufactured by Asahi Carbon Kabushiki Kaisha

*2: Asahi F200 manufactured by Asahi Carbon Kabushiki Kaisha

*3: Diana Process Oil PW-380 manufactured by Idemitsu Kosan Kabushiki Kaisha

*4: Vesta PP (calcium oxide) manufactured by Inoue Sekkai Kabushiki Kaisha

*5: Mercaptobenzothiazole

*6: Zinc dimethyldithiocarbamate

*7: Zinc di-n-butyldithiocarbamate

*8: Dipentamethylenethiuram tetrasulfide

*9: Tetraethylthiuram disulfide

*10: 4,4'-Dithio-bis-dimorpholine

*11: p,p'-Oxybis(benzenesulfonyl hydrazide)

Examples 1 to 4 and Comparative Examples 1 to 4

The copolymer mixture shown in Table 2 was kneaded together with the components shown in Compound I in Table 1 at 60 rpm for 5 minutes in a BR type Banbury mixer (internal volume: 1.7 liters) kept at a temperature of 50° C. to obtain a compound [referred to hereinafter as the compound (1)]. The compound (1) was compounded with the additives shown in Compound II in Table 1, and the resulting mixture was kneaded on a 10-inch twin roll mill kept at 50° C. for 5 minutes to obtain a compound [referred to hereinafter as the compound (2)].

TABLE 2

| | Example 1 | Example 2 | Example 3 | Example 4 | Comp. Ex. 1 | Comp. Ex. 2 | Comp. Ex. 3 | Comp.* Ex. 4 |
|---|---|---|---|---|---|---|---|---|
| Low molecular weight component copolymer | | | | | | | | |
| Amount (part by weight) | 75 | 70 | 64 | 70 | 66 | 75 | 70 | |
| Mooney viscosity | 52 | 60 | 60 | 70 | 61 | 70 | 60 | |
| Propylene content (% by weight) | 37 | 39 | 40 | 42 | 42 | 43 | 37 | |
| Iodine value (ethylidenenorbornene) | 40 | 43 | 43 | 40 | 39 | 38 | 25 | |
| Iodine value (dicyclopentadiene) | 7 | 5 | 5 | 5 | 0 | 3 | 0 | |
| High molecular weight component copolymer | | | | | | | | |
| Amount (part by weight) | 25 | 30 | 36 | 30 | 34 | 25 | 30 | |
| Mooney viscosity | 400 | 350 | 410 | 220 | 318 | 80 | 350 | |
| Propylene content (% by weight) | 32 | 33 | 31 | 30 | 32 | 41 | 32 | |
| Iodine value (ethylidenenorbornene) | 10 | 5 | 5 | 10 | 30 | 9 | 6 | |
| Iodine value (dicyclopentadiene) | 0 | 5 | 6 | 0 | 0 | 0 | 0 | |

TABLE 2-continued

|  | Example 1 | Example 2 | Example 3 | Example 4 | Comp. Ex. 1 | Comp. Ex. 2 | Comp. Ex. 3 | Comp.* Ex. 4 |
|---|---|---|---|---|---|---|---|---|
| Copolymer mixture | | | | | | | | |
| Amount (part by weight) | 100 | 100 | 100 | 100 | 100 | 100 | 100 | 100 |
| Mooney viscosity | 117 | 135 | 127 | 98 | 107 | 72 | 135 | 105 |
| Propylene content (% by weight) | 36 | 37 | 37 | 37 | 40 | 43 | 37 | 37 |
| Iodine value (ethylidenenorbornene) | 31 | 32 | 29 | 31 | 37 | 31 | 19 | 30 |
| Iodine value (dicyclopentadiene) | 5 | 5 | 5 | 4 | 0 | 0 | 0 | 0 |
| Iodine value ratio (low molecular weight/high molecular weight) | 4.7 | 4.8 | 4.3 | 4.5 | 1.3 | 4.6 | 4.2 | — |

*Comp. Ex. 4 is a single component EPDM, and is not composed of two components of low molecular weight and high molecular weight.

Subsequently, a Garvey die (as defined in ASTM-D2330) was mounded on a 50-mm extruder in which the cylinder temperature and the die temperature were set at 60° C. and 80° C., respectively, and the compound (2) was extruded through the die to evaluate the extruder-processibility. Moreover, a die having the sectional shape shown in FIG. 1 was mounted on a 50-mm extruder in which the cylinder temperature, the die temperature and the number of revolutions were set at 60° C., 80° C. and 30 rpm, respectively, and the compound (2) was extruded through the die, and thereafter heated for 10 minutes in a hot air oven at 200° C. to be cross-linked and foamed, thereby obtaining a sponge rubber.

The evaluation results of the sponge rubber obtained are shown in Table 3.

weight component copolymer is small, and therefore, the shape-retention is inferior, the stress retention is small, the compression set is large and the surface skin is bad owing to gas-escape.

In the copolymer rubber composition in Comparative Example 3, the iodine value of the low molecular weight component copolymer is small, and hence, the compression set is large, the shape-retention is inferior and the stress retention is small.

The copolymer rubber composition in Comparative Example 4 is a single component EPDM having molecular characteristics close to the average value of the composition of this invention, and is not composed of the two compo-

TABLE 3

|  | Example 1 | Example 2 | Example 3 | Example 4 | Comp. Ex. 1 | Comp. Ex. 2 | Comp. Ex. 3 | Comp. Ex. 4 |
|---|---|---|---|---|---|---|---|---|
| Extruder-processibility | | | | | | | | |
| Swell & porosity | 4 | 4 | 4 | 4 | 3 | 4 | 4 | 3 |
| Edge | 4 | 4 | 4 | 4 | 3 | 4 | 4 | 3 |
| Surface skin | 4 | 3 | 3 | 4 | 2 | 4 | 3 | 3 |
| Corner | 4 | 4 | 4 | 4 | 3 | 4 | 4 | 3 |
| Distortion | | | | | | | | |
| Shape-retention (%) | 72 | 86 | 74 | 70 | 75 | 45 | 62 | 65 |
| Stress retention (100° C.) | 0.576 | 0.636 | 0.566 | 0.521 | 0.58 | 0.24 | 0.461 | 0.375 |
| Gelation | | | | | | | | |
| Gelation time (sec) | 480 | 510 | 540 | 506 | 250 | 410 | 570 | 430 |
| Physical properties of sponge | | | | | | | | |
| Sponge density | 0.45 | 0.55 | 0.46 | 0.47 | 0.61 | 0.52 | 0.53 | 0.46 |
| Compression set (%) 70° C. × 22 hrs. | 10 | 11 | 10 | 11 | 10 | 13 | 15 | 13 |
| Surface skin | o | o | o | o | x | x | Δ | o |

From the results obtained, it is seen that the copolymer rubber composition of this invention is excellent in extruder-processibility, and gives a sponge having a good shape-retention, a high stress retention, a small sponge density, a small compression set and a long gelation time (difficult to gel).

On the other hand, in the copolymer rubber composition in Comparative Example 1, the ratio of the iodine value of the low molecular weight component copolymer to the iodine value of the high molecular weight component copolymer is less than 4/1, and therefore, the gelation time of the composition is short (easy to gel) and it is difficult to highly foam the composition. Also, the sponge surface skin is inferior.

In the copolymer rubber composition in Comparative Example 2, the Mooney viscosity of the high molecular nents of low molecular weight and high molecular weight, so that the gelation time is short and the compression set is large.

What is claimed is:

1. An ethylene-α-olefin-non-conjugated diene copolymer rubber composition, comprising a low molecular weight component copolymer and a high molecular weight component copolymer, the low molecular weight component copolymer being composed of an ethylene-α-olefin-non-conjugated diene copolymer having a Mooney viscosity ($ML_{1+4}$, 100° C.) of 10 to 150, an α-olefin content of 30 to 60% by weight and an iodine value of 37 to 65; the high molecular weight component copolymer being composed of an ethylene-α-olefin-non-conjugated diene copolymer having a Mooney viscosity ($ML_{1+4}$, 100° C.) of 100 to 500, an α-olefin content of 15 to 50% weight and an iodine value of 3 to 15; and wherein the ratio of the iodine value of the low molecular weight component copolymer to the iodine value of the high molecular weight component copolymer is at least 4/1, and the weight ratio of the low molecular weight component copolymer to the high molecular weight component copolymer is 51/49 to 95/5.

2. The composition according to claim 1, wherein the α-olefin is an α-olefin having 3 to 12 carbon atoms.

3. The composition according to claim 1, wherein the α-olefin is propylene.

4. The composition according to claim 1, wherein the low molecular weight component copolymer has an α-olefin content of 35 to 55% by weight.

5. The composition according to claim 1, wherein the high molecular weight component copolymer has an α-olefin content of 15 to 45% by weight.

6. The composition according to claim 1, wherein the α-olefin content of the low molecular weight component copolymer is higher than that of the high molecular weight component copolymer.

7. The composition according to claim 1, wherein the non-conjugated diene is at least one member selected from the group consisting of ethylidenenorbornene, dicyclopentadiene, 5-vinyl-2-norbornene, 2,5-norbornadiene, 1,4-pentadiene, 1,4-hexadiene, 1,5-hexadiene, 1,7-octadiene and 4,5-dimethyl-1,7-octadiene.

8. The composition according to claim 1, wherein the non-conjugated diene is at least one member selected from the group consisting of ethylidenenorbornene and dicyclopentadiene.

9. The composition according to claim 1, wherein the low molecular weight component copolymer has an iodine value of 37 to 55.

10. The composition according to claim 1, wherein the high molecular weight component copolymer has an iodine value of 5 to 12.

11. The composition according to claim 1, wherein the low molecular weight component copolymer has a Mooney viscosity ($ML_{1+4}$, 100° C.) of 30 to 100.

12. The composition according to claim 1, wherein the high molecular weight component copolymer has a Mooney viscosity ($ML_{1+4}$, 100° C.) of 150 to 450.

13. The composition according to claim 1, wherein the difference between the Mooney viscosities ($ML_{1+4}$, 100° C.) of the low molecular weight component copolymer and the high molecular weight component copolymer is 50 to 450.

14. The composition according to claim 1 which further contains at least one member selected from the group consisting of a filler, a softening agent, a cross-linking agent and a foaming agent.

15. The composition according to claim 14, which contains at least one foaming agent selected from the group consisting of inorganic foaming agents and organic foaming agents in an amount of 1 to 15 parts by weight per 100 parts by weight of the copolymer rubber composition.

* * * * *